(12) United States Patent
Bromberg

(10) Patent No.: US 9,158,715 B1
(45) Date of Patent: Oct. 13, 2015

(54) MULTI-INPUT MEMORY COMMAND PRIORITIZATION

(71) Applicant: Marvell Israel (M.I.S.L.) Ltd., Yokneam (IL)

(72) Inventor: Dror Bromberg, Michmoret (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 212 days.

(21) Appl. No.: 13/773,930

(22) Filed: Feb. 22, 2013

Related U.S. Application Data

(60) Provisional application No. 61/602,976, filed on Feb. 24, 2012.

(51) Int. Cl.
*G06F 12/00* (2006.01)
*G06F 13/16* (2006.01)
*G06F 12/08* (2006.01)

(52) U.S. Cl.
CPC ........ *G06F 13/1689* (2013.01); *G06F 12/0844* (2013.01); *G06F 12/0853* (2013.01); *G06F 13/161* (2013.01); *G06F 13/1631* (2013.01)

(58) Field of Classification Search
CPC .............. G06F 13/161; G06F 13/1631; G06F 12/0844; G06F 12/0853
See application file for complete search history.

(56) References Cited

U.S. PATENT DOCUMENTS

| | | | | |
|---|---|---|---|---|
| 5,197,035 A * | 3/1993 | Ito | ............................. | 365/230.05 |
| 5,940,334 A * | 8/1999 | Holst | ............................. | 365/190 |
| 7,417,907 B1 * | 8/2008 | Liu et al. | ....................... | 365/196 |
| 7,814,385 B2 * | 10/2010 | Bahl | ............................. | 714/733 |
| 2004/0111690 A1 * | 6/2004 | Reuland et al. | ................. | 716/17 |
| 2008/0122662 A1 * | 5/2008 | Hu | ................................. | 341/51 |
| 2010/0124141 A1 * | 5/2010 | Arai | .......................... | 365/230.05 |

* cited by examiner

*Primary Examiner* — Shawn X Gu

(57) ABSTRACT

Described herein are memory apparatuses, and methods of operating the same, that have a memory array module configured, in a given clock cycle, to either receive a first command to write to a first memory location having a first address, or receive a second command to read from a second memory location having a second address. A comparison circuit of the memory apparatus is configured to compare the first address to the second address. The memory apparatus also includes an output circuit configured to output data stored in the memory array module at the second memory location based at least on the first address and second address being different. The output circuit is also configured to output data received from a write data input, bypassing the memory array module, when the first address and the second address are the same.

14 Claims, 3 Drawing Sheets

MULTI-INPUT MEMORY COMMAND PRIORITIZATION

CROSS REFERENCE TO RELATED APPLICATIONS

The present disclosure claims priority to U.S. Provisional Patent Application No. 61/602,976, filed on Feb. 24, 2012, which is incorporated herein by reference in its entirety.

TECHNICAL FIELD

Embodiments of the present disclosure relate to the field of memories, and in particular to memories configured to handle concurrent read and write commands to the same address.

BACKGROUND

The background description provided herein is for the purpose of generally presenting the context of the disclosure. Work of the presently named inventor, to the extent that it is described in this background section, as well as aspects of the description that may not otherwise qualify as prior art at the time of filing, are neither expressly nor impliedly admitted as prior art against the present disclosure.

Multi-port memories, such as dual-port static random access memories (SRAM) and dual-port dynamic random access memories (DRAM), are configured to receive multiple instructions on the same clock cycle. This enables the multi-port memory to, for example, concurrently write and read data. This includes concurrently reading data from, and writing to, the same DRAM array. However, if the read and write addresses associated with the concurrently received read and write commands are the same address, then the read data that is output from the memory device cannot be guaranteed. This is because a data word line is in an unknown state during a write operation, and any data concurrently read from it is therefore unreliable. To address this problem in conventional systems, a memory controller or other device that arbitrates access to a multi-port memory avoids issuing concurrent read and write commands to the memory device when the addresses are the same.

SUMMARY

Embodiments of the present disclosure include a memory apparatus having a memory array module that is configured, in a given clock cycle, to either receive a first command to write to a first memory location having a first address, or receive a second command to read from a second memory location having a second address. A comparison circuit of the memory apparatus is configured to compare the first address to the second address. The memory apparatus also includes an output circuit configured to output data stored in the memory array module at the second memory location based at least on the first address and second address being different. The output circuit is also configured to output data received from a write data input, bypassing the memory array module, when the first address and the second address are the same.

In various embodiments, the output circuit is further configured to compare the first command to the second command. The output of the data received from the write data input, bypassing the memory array module, occurs when the compared first address and second address are the same, and when the compared first command and second command include a write command and a read command, respectively.

In embodiments, the memory apparatus includes a bypass circuit that is coupled to the write data input, and an access circuit to write the data received on the write data input to an addressable memory location of the memory array module that corresponds to a write command received during a clock cycle. The memory apparatus includes the bypass circuit, and the output circuit is further configured to output the data written to the bypass circuit when at least the compared first address and second address are the same.

In embodiments, the memory apparatus includes a multiplexer to select one of the memory array output data or the bypass circuit output data based on the comparison of the memory addresses.

Embodiments of the present disclosure also include a method of operating a memory device. The method includes receiving, by a memory array module, in a clock cycle, a first instruction to write data to a first memory location, having a first address, of the memory array module. The method also includes receiving by the memory array module, in the clock cycle, a second instruction to read data stored at a second memory location, having a second address, of the memory array module. A comparison, by a comparison circuit of the memory device, is made of the first address and the second address. Based at least on the first address being the same as the second address, data received on a write data input of the memory device is selectably output, by an output circuit, to a data output of the memory device, wherein the outputting includes bypassing the memory array module. In various embodiments, the selectably outputting and bypassing the memory array module is further based on a determination, by the comparison circuit, that the first instruction and the second instruction include a write instruction and a read instruction, respectively.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure include multi-port memory devices, such as, for example, dual-port static random access memory (SRAM) devices or dual-port Dynamic Random Access Memory (DRAM) devices, that are capable of handling concurrent read and write commands for the same memory address. Data being written to the memory array module of a multi-port memory device by a write command for a particular address typically is considered the most up-to-date data (i.e., the "interesting" data). Embodiments of the present disclosure respond to concurrent read and write commands for a particular address by outputting the write data associated with the concurrent write command. An access circuit of a memory array module concurrently writes data to both the memory location in the memory array of the memory array module specified by the write memory address, as well as to a memory bypass circuit. Upon receiving concurrent read and write commands and determining that the read and write addresses are the same, an output circuit outputs data from the bypass circuit instead of from the memory location.

As used herein, concurrently received commands include commands that are received on the same clock cycle, such as on the rising or falling edge of a clock cycle. This includes commands that are received by a memory device on the same clock cycle, as well as commands that are received by an internal memory array module of the memory device on the same clock cycle.

Figure 1:
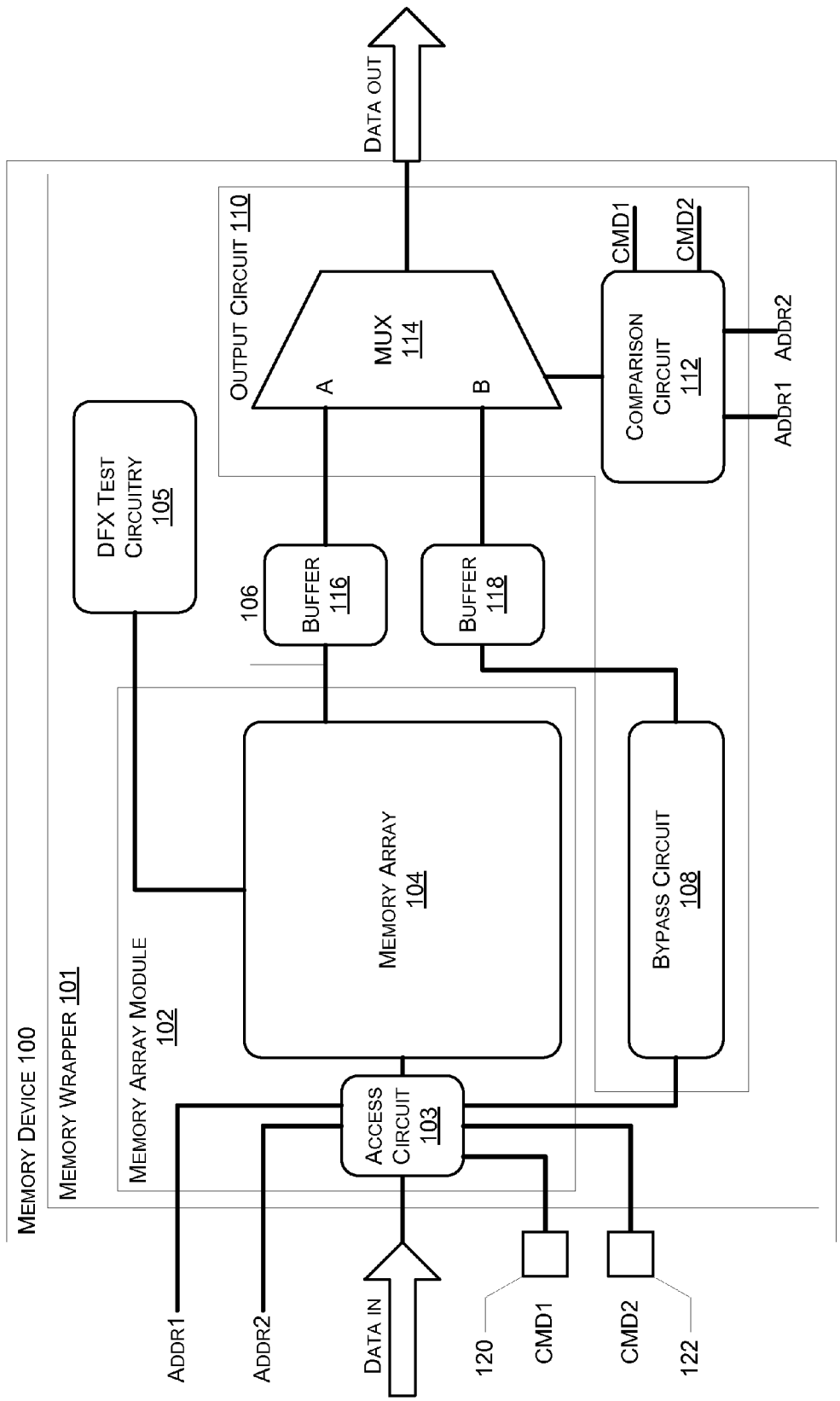
FIG. 1 schematically illustrates a memory device configured to handle concurrently received read and write commands for the same memory, in accordance with an embodiment.

FIG. 1 schematically illustrates a dual-port memory device 100 that is configured to handle concurrently received read and write commands for the same memory address, in an embodiment. In various embodiments, the dual-port memory device 100 includes a memory wrapper 101, which may be for example a Design for X (DFX) wrapper. The memory wrapper 101 includes various circuitry such as a memory array module 102 and DFX test circuitry 105. The memory array module 102 includes an access circuit 103 and a memory array 104. The memory wrapper 101 includes various circuitry, and appears as a level of abstraction to other components within the memory device 100, meaning that, to the rest of the memory device 100, the memory wrapper 101 appears as a memory component that receives commands, data, and addresses, and outputs data stored in the memory array 102 of the memory wrapper 101.

The memory wrapper 101 also includes DFX test circuitry 105, which performs various test functions on components within the memory wrapper 101. Examples of such test functions include validation tests that validate that the components within the memory wrapper function properly (including the memory array module 102).

The memory device 100 is dual-port. As used herein, dual-port means that the memory device 100 is configured to concurrently receive two memory commands, such as read and write commands, on two command ports of the memory device 100, and to write to two addressable memory locations concurrently, read from two addressable memory locations concurrently, and read from a first addressable memory location while concurrently writing to a second addressable memory location. This includes reading from two locations concurrently, writing to two locations concurrently, and reading and writing concurrently to two memory locations within the same memory array of memory device 100. As such, the various circuitry within the memory device 100, including the circuitry within the memory wrapper 101, includes suitable architecture, including ports, busses, logic, etc., to concurrently receive two memory commands, to concurrently output data from two memory locations, to concurrently accept data to be written to two memory locations, to concurrently read from and write to two separate locations within a memory array, and so forth. Thus, the memory device 101 may have more than two physical external ports, including two command ports 122, two address inputs, two data ports, and so forth.

The access circuit 103 is configured to concurrently receive two commands (CMD1 and CMD2), on the same clock cycle, and to execute corresponding memory access functions on the memory array 104 according to the memory addresses related to the commands. Where one of the commands is a write command, the access circuit 103 receives write data (DATA IN) and causes the data to be written to an addressable memory location of the memory array 104, such as, for example, by precharging corresponding bit lines, selecting corresponding word lines, and driving the corresponding bit lines to write the data to the addressable memory location associated with the write address.

Where one of the commands is a read command, the access circuit 103 causes data from the memory location associated with the read address to be read out to an output line 106. This includes, for example, precharging the bit lines, selecting the word lines, and then sensing and amplifying the stored bits in the memory cells that correspond to the read address.

The access circuit 103 is configured to receive at least two access operations concurrently, such as two read commands, two write commands, and a read command plus a write command. During a write operation on the memory array 104, the access circuitry causes the write data to be written to memory array 104 and also causes the write data to be written to a bypass circuit 108, in an embodiment. In embodiments, the bypass circuit 108 is a cache path. Various embodiments of the bypass circuit include a plurality of flip-flops (not illustrated) or other types of memory. The bypass circuit 108 thus temporarily stores the write data that is concurrently written to the memory array 104. The bypass circuit 108 includes at least enough temporary storage to write an entire data word. For example, in an embodiment, where the bypass circuit 108 includes a plurality of flip-flops, the number of flip flops is at least the same as a number of memory cells in a word line of the memory array 104.

In embodiments, the bypass circuit 108 is designed so that data can be written to it more quickly than data can be written to a word line in the memory array 104. For example, writing to a bypass circuit 108 that includes a plurality of flip-flops is faster than writing to a conventional DRAM memory array word line, because it does not require precharging of bit lines, selecting a word line, and driving the corresponding bit lines in order to write the data. Writing the write data to the bypass circuit 108 is at least fast enough to enable the output circuit 110 to select its output within the time needed to output data from a concurrent read command. In the case of SRAM, writing to the memory array 104 is performed at the same speed as writing to the bypass circuit 108, in an embodiment.

The output circuit 110, which is part of the memory wrapper 101, is configured to output data from either the output line 106 or the bypass circuit 108, depending at least on whether the first address (ADDR1) associated with the first access command (CMD1) is the same as the second address (ADDR2) associated with the second access command (CMD2). The output circuit 110 is also, in various embodiments, configured to output data from the output line 106 or the bypass circuit 108 based on the first access command (CMD1) and the second access command (CMD2) including a read command and a write command, respectively. A comparison circuit 112, which may be a comparator or other logic device, accepts as input at least ADDR1 and ADDR2 along with CMD1 and CMD2. The comparison circuit 112 is configured to compare ADDR1 to ADDR2, along with CMD1 and CMD2, and a comparison result is output to the multiplexer 114. In the case where ADDR1 and ADDR2 are the same while CMD1 and CMD2 include a read command and a write command, respectively, the comparison result output by the comparison circuit 112 indicates to read from the bypass circuit. In other cases, such as where ADDR1 and ADDR2 are different, or where CMD1 and CMD2 do not include a read command and a write command, the output result indicates to read from the memory array 104. Based on the comparison result output by the comparison circuit 112, a multiplexer 114 selects for output (DATA OUT) one of either port A corresponding to the output line 106, or port B corresponding to the bypass circuit 108. Thus, where ADDR1 and ADDR2 are the same while CMD1 and CMD2 include a read and a write, respectively, the multiplexer 114 selects port B for output.

Because writing data to the memory array 104 may be slower in a DRAM than writing data to the bypass circuit 108, the data may be output from the output circuit 110 faster than the data can be written to the memory array 104. In some embodiments, in at least some instances, the data may be concurrently output from the memory wrapper 101 and written to the memory array 104. In a SRAM, the speed of writing data to the memory array 104 and to the bypass circuit 108 is the same. For example, if in a first clock cycle the access circuit 103 receives a read command and a write command to the same address, then in this same clock cycle the data is written to both the memory array 104 and the bypass circuit 108. The data is then output from the output circuit 110 on the next clock cycle (clock cycle #2). Data is output from memory array 104 one clock cycle after receipt of the read command, and various embodiments of the present disclosure do not add any extra latency of the output data.

Thus, the output circuit 110 is configured to enable the dual-port memory device 100 to respond to concurrent read and write commands received on the same clock cycle, on command ports 120 and 122 while guaranteeing that the read data is the same as the write data.

The memory wrapper 101 also includes buffers 116 and 118, although some embodiments of the present disclosure do not include buffers 116 and 118. The buffers 116 and 118 may include flip-flops (not illustrated), delay elements, or other temporary memory storage. The presence of buffers 116 and 118 alter the timing of output of the data from the memory wrapper 101. In particular, where the dual-port memory device 100 is a high frequency memory device, the buffers 116 and 118 enable precise timing adjustment, in order to handle the precise timing requirements of high-speed memory. The buffers 116 and 118 enable the output circuit 110 to be compatible with high frequency memory devices.

Figure 2:
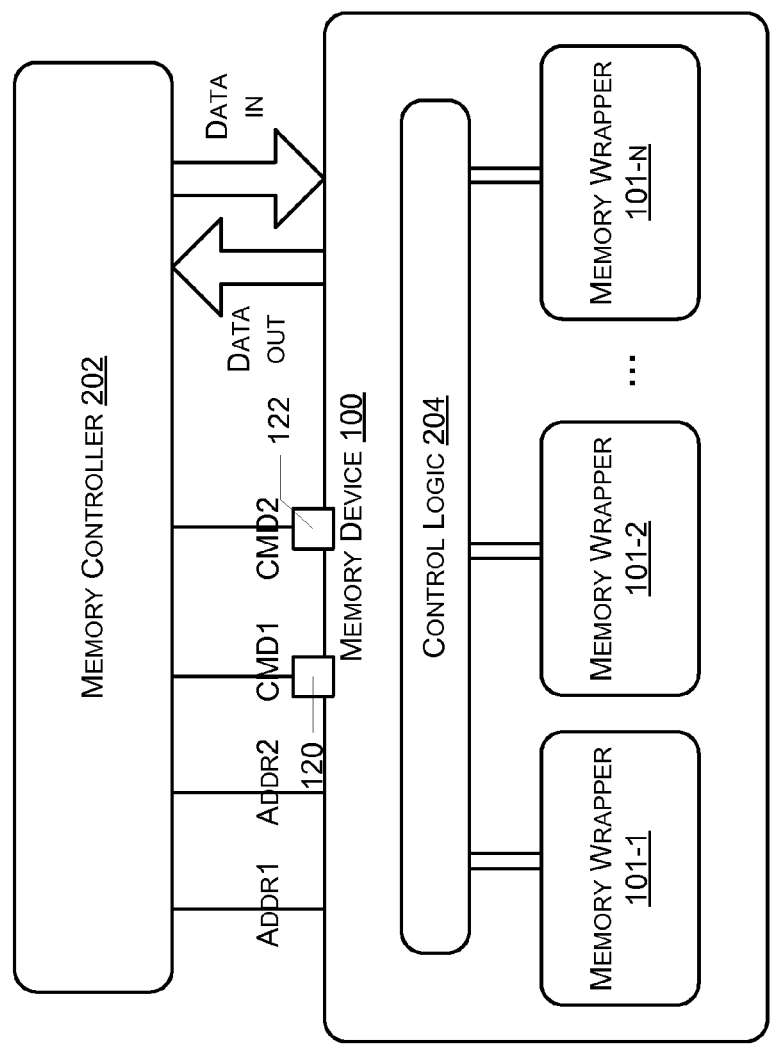
FIG. 2 schematically illustrates a system including a dual-port digital memory device and a memory controller configured to concurrently read and write data at the same memory address, in accordance with an embodiment.

FIG. 2 schematically illustrates a system 200 including a dual-port memory device 100 and a memory controller 202, in an embodiment. The dual-port memory device 100 concurrently reads and writes data at the same memory address. The dual-port memory device 100 includes N memory wrappers 101. The memory controller 202 outputs a first command (CMD1) and an associated address (ADDR1) to the dual-port memory device 100. The memory controller 202 also outputs a second command (CMD2) and an associated address (ADDR2) to the dual-port memory device 100. Control logic 204 routes the addresses and commands to the appropriate ones of memory wrappers 101. As noted above with respect to FIG. 1, the memory wrappers 101 are configured to concurrently handle read and write addresses to the same locations within their respective memory arrays.

Figure 3:
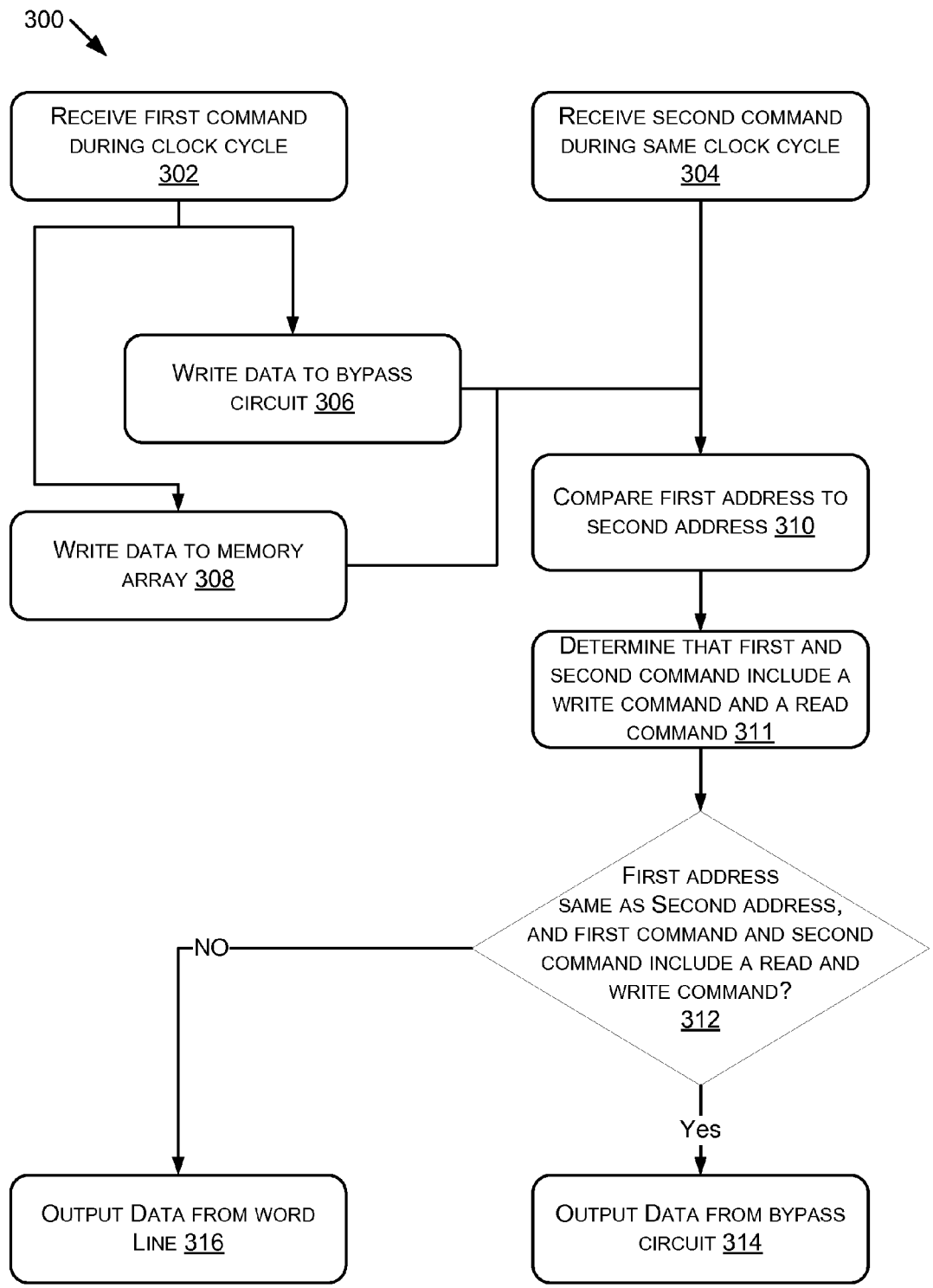
FIG. 3 illustrates a process of concurrently reading and writing data to the same memory address using the device of FIG. 1.

FIG. 3 illustrates a process of concurrently reading and writing data to the same memory address using the device of FIG. 1. At 302, an access circuit, such as the access circuit 103, receives a first command, such as a write command to write data to a first memory location, having a first address, of a memory array of a memory array module (such as the memory array 104 of the memory array module 102). At 304, the access circuit receives a second command, such as a read command to read data stored at a second memory location, having a second address, of the memory array. The first command and the second command are received concurrently, such as on the same clock cycle. The first command is received on a first command port of the memory device and the second command is received on a second command port of the memory device, in an embodiment.

At 306, where the first command is a write command, the access circuit causes the data to be written to a bypass circuit, such as the bypass circuit 108. At 308, where the first command is a write command, the access circuit writes the first data received on a data input associated with the first command to a word line of a memory array module. This may include, for example, precharging bit lines, selecting the word line according to the write address, and driving the bit lines to write the data to the memory cells in the memory array module. The writing to the bypass circuit at 306 may occur concurrently with the writing to the memory array at 308.

At 310, a comparison circuit, such as the comparison circuit 112, compares the first address to the second address, and compares the first command to the second command. At 311, the comparison circuit determines that the first command and the second command include a write command, and a read command, respectively.

Upon a determination at 312 that the first address and the second address are the same—and that the first command and the second command include a write command and a read command, respectively—at 314 an output circuit, such as output circuit 110, outputs the data received on a write data input of the memory array to a data output of the dual-port memory device. The outputting includes bypassing the memory array associated with the second address. This is accomplished by a multiplexer, such as the multiplexer 114, selecting to output data from the bypass circuit, thereby refraining from selecting data from a word line of the memory array associated with the second address for output. In some instances, the outputting of the data written to the bypass circuit occurs before the data is fully written to the word line of the memory array associated with the first address. In some instances, the outputting of the data written to the bypass circuit occurs during a time that the data is written to the word line of the memory array associated with the first address (concurrent writing and outputting of the data).

Upon a determination at 312 that the first address and the second address are different, and/or that the first command and the second command do not include a write command and a read command, respectively, at 316 the output circuit outputs data read from a word line associated with the second memory location of the memory array according to the read address.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A memory apparatus, comprising:
a memory array module configured, in a clock cycle, to (1) receive write data and a first command to write the write data to a first memory location having a first address, and (2) receive a second command to read from a second memory location having a second address;
a bypass circuit configured to, irrespective of whether the first address matches the second address, receive the write data associated with the first command in parallel to the write data also being received at the memory array;
a comparison circuit configured to compare the first address to the second address; and
a multiplexer circuit configured to (i) receive the write data from the bypass circuit, irrespective of whether the first address matches the second address, (ii) selectively output read data from the second memory location, in response to the first address being different from the second address, and (iii) selectively output the write data received from the bypass circuit, in response to the first address being same as the second address.

2. The memory apparatus of claim 1, wherein:
the comparison circuit is further configured to compare the first command to the second command; and
the multiplexer circuit is further configured to selectively output the write data from the bypass circuit, further in response to (i) one of the first and second commands being a write command, and (ii) another of the first and second commands being a read command.

3. The memory apparatus of claim 1, wherein the memory array module comprises:
an access circuit configured to write the write data to (i) the first memory location having the first address, and (ii) the bypass circuit.

4. The memory apparatus of claim 3, wherein the bypass circuit comprises a plurality of flip flops; and
a number of flip flops in the bypass circuit corresponds to a width of a word line of the memory array module.

5. The memory apparatus of claim 1, wherein the multiplexer circuit is further configured to selectively output the write data received from the bypass circuit, without first writing the write data to the memory array module.

6. The memory apparatus of claim 1, wherein the memory apparatus is a dual-port random access memory.

7. The memory apparatus of claim 1, wherein at least the multiplexer circuit is included within a memory wrapper of the apparatus that includes test circuitry configured to perform validation tests on one or more components within the memory wrapper.

8. A method of operating a memory device, comprising:
receiving, by a memory array module, in a clock cycle, a first instruction to write data to a first memory location, having a first address, of the memory array module;
receiving by the memory array module, in the clock cycle, a second instruction to read data stored at a second memory location, having a second address, of the memory array module;
comparing, by a comparison circuit of the memory device, the (i) first address and (ii) second address;
irrespective of whether the first address matches the second address, receiving at a multiplexer, by bypassing the memory array module, the write data; and
based at least on the first address being the same as the second address, selectably outputting, by the multiplexer, the write data received by bypassing the memory array module.

9. The method of claim 8, wherein bypassing the memory array module includes selecting data on a bypass circuit.

10. The method of claim 9, further comprising concurrently writing the write data to (i) the first memory location of the memory array module, and (ii) the bypass circuit.

11. The method of claim 8, wherein, selectably outputting and bypassing the memory array module is further based on a determination, by the comparison circuit, that the first instruction and the second instruction include a write instruction and a read instruction, respectively.

12. The method of claim 8, wherein the outputting occurs prior to the write data being fully written to the first memory location of the memory array module.

13. The method of claim 8, further comprising writing the write data to the memory array module during a time that the write data is output from the memory device.

14. The method of claim 8, further comprising (i) receiving the first instruction on a first port of the memory device and (ii) receiving the second instruction on a second port of the memory device.

* * * * *